July 17, 1928.
A. JOST
1,677,638
SAFETY DEVICE FOR AIRPLANES
Filed March 17, 1927   2 Sheets-Sheet 1
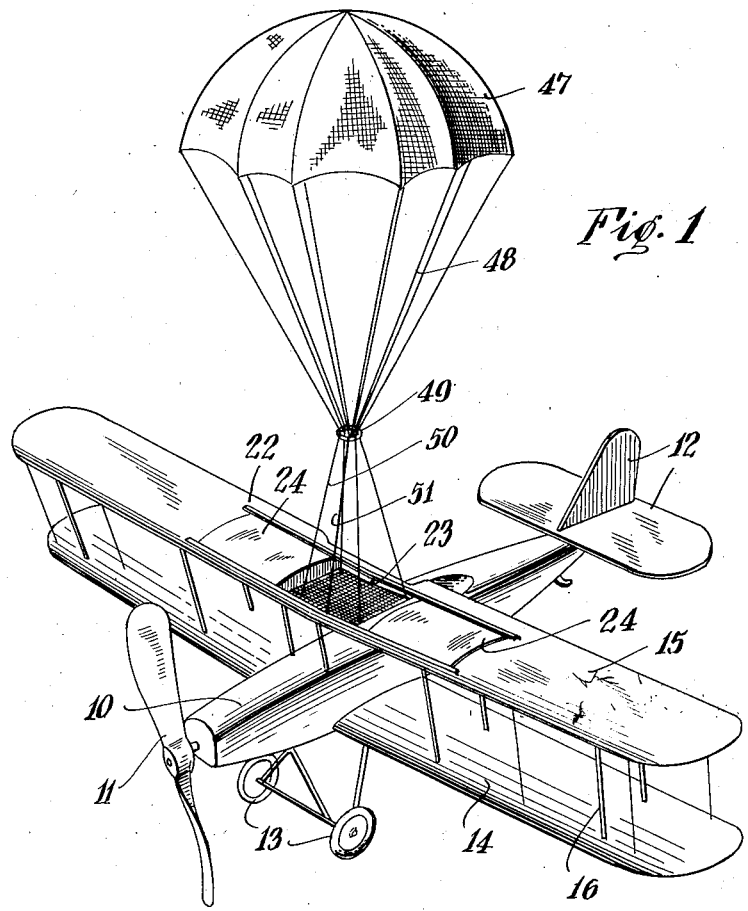
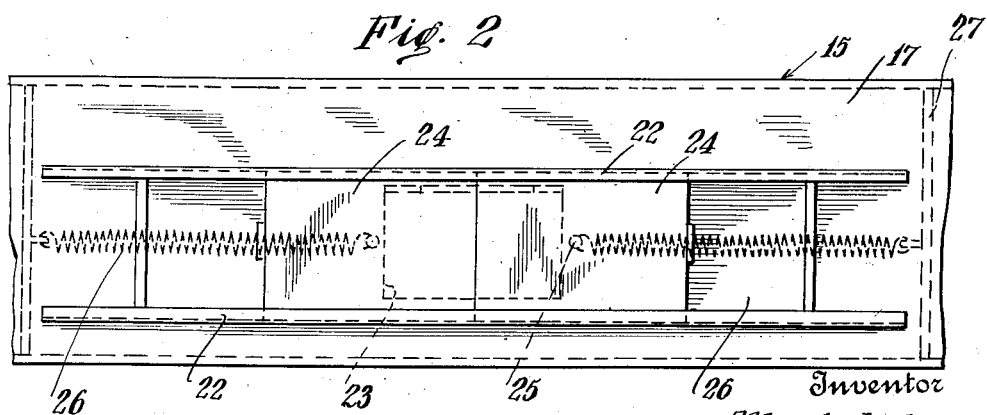
Inventor
Albert Jost
By his Attorney July 17, 1928.
A. JOST
1,677,638
SAFETY DEVICE FOR AIRPLANES
Filed March 17, 1927    2 Sheets-Sheet 2
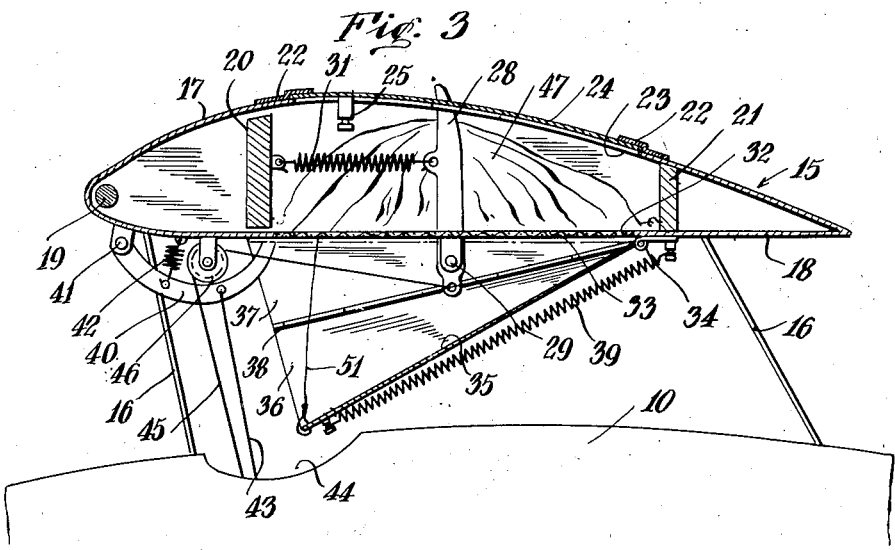
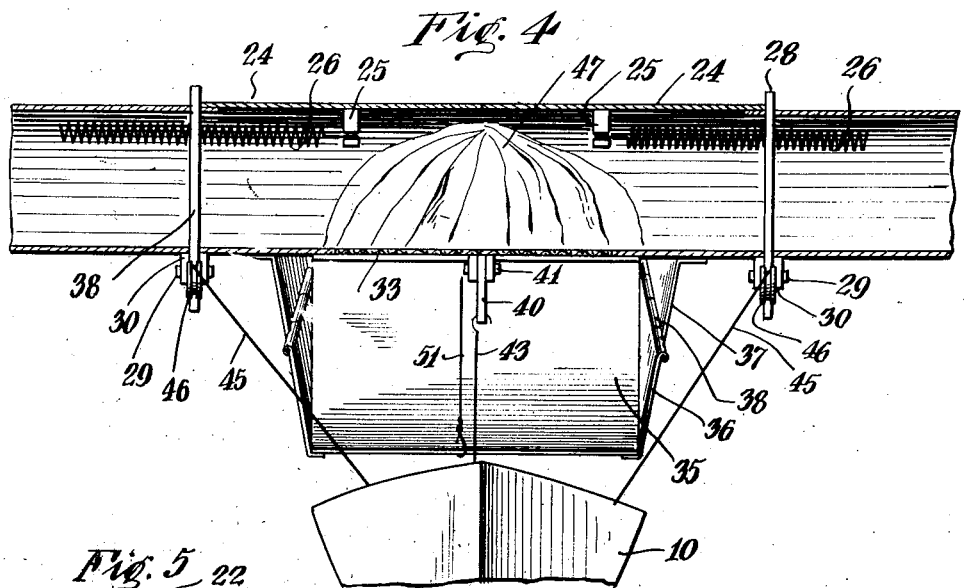
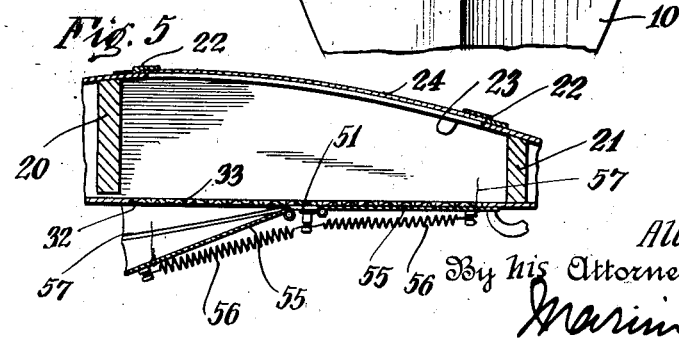
Inventor
Albert Jost
By his Attorney Patented July 17, 1928.

1,677,638

UNITED STATES PATENT OFFICE.

ALBERT JOST, OF YONKERS, NEW YORK.

SAFETY DEVICE FOR AIRPLANES.

Application filed March 17, 1927. Serial No. 175,984.

This invention relates to safety devices and more particularly to those applicable to airplanes and other heavier than air flying machines of the bi-plane or like type.

Heretofore, the lack of such safety devices have caused many airplanes to become wrecked and the death or injury of the operator. In the present flying machines, it has frequently occurred that something would go wrong with the motor or other controls and that during the plane's subsequent fall, it would be necessary for the pilot to resort to all of his skill to make a safe landing.

However, many times the plane falls so speedily as to make the operator lose his control or he may even lose consciousness and in such instances, the result is invariably fatal.

It is therefore, the main object of this invention to provide an efficient parachute which will automatically open upon its release and arrange the releasing means in a manner to be conveniently operated from the cock pit instantly upon the pilot becoming aware that something has occurred imperiling the safety of the vehicle.

It is a further feature to provide such safety devices in a manner to be completely concealed until their use is required, the device occupying no usable space and adding no appreciable weight.

Another aim is in the provision of a device characterized by simplicity and effectiveness in operation and which is inexpensive to construct and apply.

These several advantageous features are accomplished by the novel design, construction and combination of parts hereinafter described and shown in the accompanying drawings, forming a material part of this disclosure, and in which:—

Figure 1 is a perspective view of a conventional bi-plane illustrating the application and use of the invention.

Figure 2 is a fragmentary top plan view of the upper plane showing the slides as closed over the parachute and from which it emerges.

Figure 3 is a longitudinal sectional view of the upper wing carrying the parachute.

Figure 4 is a transverse sectional view of the same.

Figure 5 is a view similar to Figure 3 but showing a modification in construction.

In the type of airplane shown, the numeral 10 designates in general the fuselage or body having a propeller 11 at the front, rudders 12 at the rear and landing wheels 13 extending below.

The lower plane 14 has its opposed wings directed laterally of the fuselage, above which is the upper plane 15, the same being connected by rods 16 as shown.

The upper plane is composed preferably of thin material having considerable space between its upper and lower walls, 17 and 18 respectively, the same being reenforced by a longitudinally disposed rod 19 at the front and fixed upright partitions 20 and 21 midway in their thickness.

A pair of overhanging guides 22 are fixed in parallel spaced relation on the upper wall 17 through which is an opening 23 and movably mounted between the guides are two opposed plate slides 24 acting as covers for the opening and meeting at the center of the plane.

Secured in the underside of these plates are studs 25 to engage tension springs 26 fastened at their outer ends to transverse bars 27, the pull of these springs operating to withdraw the covers when released.

These covers are normally held in closed position by pairs of levers 28 pivoted at 29 on brackets 30 extending downward from the lower wall 18 of the plane wing and are held upright by springs 31 attached at their forward ends to the cross piece 20, in an engaging position.

Below the opening 23 in the upper wall is another opening 32 in the lower wall 18, the same being covered by a screen or net 33, through which air may readily pass and connected by a hinge 34 at the rear edge of the screened opening 32 is a plate 35 having side elements 36 and 37 connected by hinges 38, which permit the same to fold inwardly allowing the plate 35 to fold closely against the under surface of the wing wall 18 when desired.

The plate 35 is held normally distended by a tension spring 39 and when closed is retained by a curved lever 40 pivoted at 41, at the front edge centrally of the wing wall 18, this lever being drawn into engagement by a short tension spring 42.

A cord or pull rod 43 is attached to the lever 40 to extend into the cock pit 44 and adjacent to it are the lower ends of similar pull elements 45 passing over idle wheels 46 and attached to the lower ends of the release levers 28 to draw them to one side, out of engagement with the covers 24, permitting them to move apart.

Disposed in the space between the openings 23 and 32, to rest on the net 33 is a parachute 47 having stays 48 passed through a ring 49, the lower ends 50 of these stays being secured in the wing structure to support the entire apparatus when in open operative position, as best seen in Figure 1.

Another cord 51 serves to close the lower plate 35 when the parachute is in operation.

On the modification shown in Figure 5, a pair of opposed cover plates 55 are hinged to a bar 57 disposed centrally below the opening 32 and drawn downwardly when released by springs 56, cords 57 being used to retain the plates when closed.

From the foregoing, it will be seen that means have been provided whereby a parachute may be incorporated into an airplane and if the same be properly proportioned, the apparatus may be sustained in the air for a considerable period of time, its descent being delayed and its landing force materially broken.

Although the foregoing is generally descriptive and suggestive of a preferred embodiment of the invention, it will be understood that changes in detail of construction, proportions and arrangements may be made within the spirit and scope of the appended claims.

Having thus described my invention, what I claim as new and desire to secure by Letters Patent, is:—

1. An airplane comprising a fuselage having upper and lower wings, a chamber in the upper wing having an opening in its upper wall, a parachute anchored in said chamber and normally folded therewithin, covers for the opening slidable outwardly in the upper wing to permit egress of the parachute, means to release said covers from the fuselage, and means for directing air to the parachute.

2. An airplane comprising a fuselage having upper and lower wings, a chamber in the upper wing having an opening in its upper and lower walls, covers for the openings, a grate for the lower opening, a parachute anchored in the chamber and wholly concealed therein, means to displace said covers, and means combined with the lower cover to direct air through the grate to initially inflate said parachute, both of said means being operable from the cock pit of said fuselage.

3. A heavier-than-air flying machine including a fuselage having wings, one of said wings being hollow and having openings in both its upper and lower walls, sliding covers on the upper wall for the opening, a swinging cover on the lower wall, a netting fixed in the lower opening, a parachute anchored in the space between said walls to emerge through the upper opening, and means in the cock pit of said fuselage to control said covers and emergence of said parachute.

4. A heavier-than-air flying machine including a fuselage having wings, one of said wings being hollow and having openings in both its upper and lower walls, sliding covers on the upper wall for the opening, a swinging cover on the lower wall, a parachute disposed in said space to receive air from said swinging cover, and means to control said covers.

In witness whereof I have affixed my signature.

ALBERT JOST.